United States Patent [19]

Siryj et al.

[11] 4,286,790
[45] Sep. 1, 1981

[54] OPTICAL DISC CHANGER APPARATUS

[75] Inventors: Bohdan W. Siryj, Cinnaminson; Alan P. Gilson, Collingswood, both of N.J.

[73] Assignee: RCA Corporation, New York, N.Y.

[21] Appl. No.: 41,678

[22] Filed: May 23, 1979

[51] Int. Cl.[3] .......................... G11B 17/00; G11B 5/48
[52] U.S. Cl. .................................. 369/36; 358/128.5; 360/133
[58] Field of Search .................. 274/9 B, 10 R, 10 D; 360/86, 98, 133; 358/128.5, 128.6; 206/309, 312, 444

[56] References Cited

U.S. PATENT DOCUMENTS

| | | | |
|---|---|---|---|
| 3,846,836 | 11/1974 | Masse et al. | 360/98 |
| 4,101,027 | 7/1978 | Kohl et al. | 360/98 |
| 4,127,882 | 11/1978 | Kohl et al. | 360/98 |
| 4,143,408 | 3/1979 | McGinnis et al. | 360/98 |

Primary Examiner—Steven L. Stephan
Attorney, Agent, or Firm—E. M. Whitacre; J. S. Tripoli; J. E. Roehling

[57] ABSTRACT

A high speed data storage and retrieval system includes a storage module, a reader and a changer apparatus. Disc records enclosed in protective cartridges are transported between the reader and the storage module by the changer apparatus. The reader includes two mechanical systems—a system for receiving, securing and spinning a disc while it is enclosed in the cartridge and a pair of read heads which retrieve data stored on the surface of the disc. The storage module includes a plurality of storage locations for storing the discs. The changer apparatus comprises a carriage with a drive mechanism for driving the carriage to a desired position along the length of the storage module and at least two carriers for transporting discs with independent drive mechanisms. The carrier drive mechanisms drive the carriers in a direction normal to the direction which the carriage is driven. Simultaneous movement of the carriage and carriers permits high speed access of data.

4 Claims, 8 Drawing Figures

OPTICAL DISC CHANGER APPARATUS

The present invention relates generally to novel information storage and retrieval systems and particularly to playback apparatus therefor which may be employed to recover data from information tracks on an optical disc record.

There is a continuous need for systems which can store relatively large quantities of data in permanent form and which can retrieve the stored data in a relatively short period of time. With present-day technology 12" diameter optical disc having a track-to-track spacing of approximately 1.25 $\mu$m can store $10^{11}$ bits of information. A system containing 100 optical discs would have a capacity of approximately $10^{13}$ bits of data.

In accordance with the principles of the present invention a disc changer apparatus for use in a high speed information storage and retrieval system for optically reading data stored on an optical disc is provided. The system includes a storage module for storing a plurality of optical discs in protective cartridges along its length and a reader for optically reading data stored on the optical discs. The disc changer comprises a carriage having at least two positioning and retracting carriers. Gripping means, coupled to the carriers, grip a protective cartridge having an optical disc enclosed therein. Further, the disc changer includes two driving means. The first driving means propels the carriage such that the carriage traverses the length of the storage module to any desired position. The second driving means propels the carriers such that the carriers move in a direction normal to the carriage.

Figure 1:
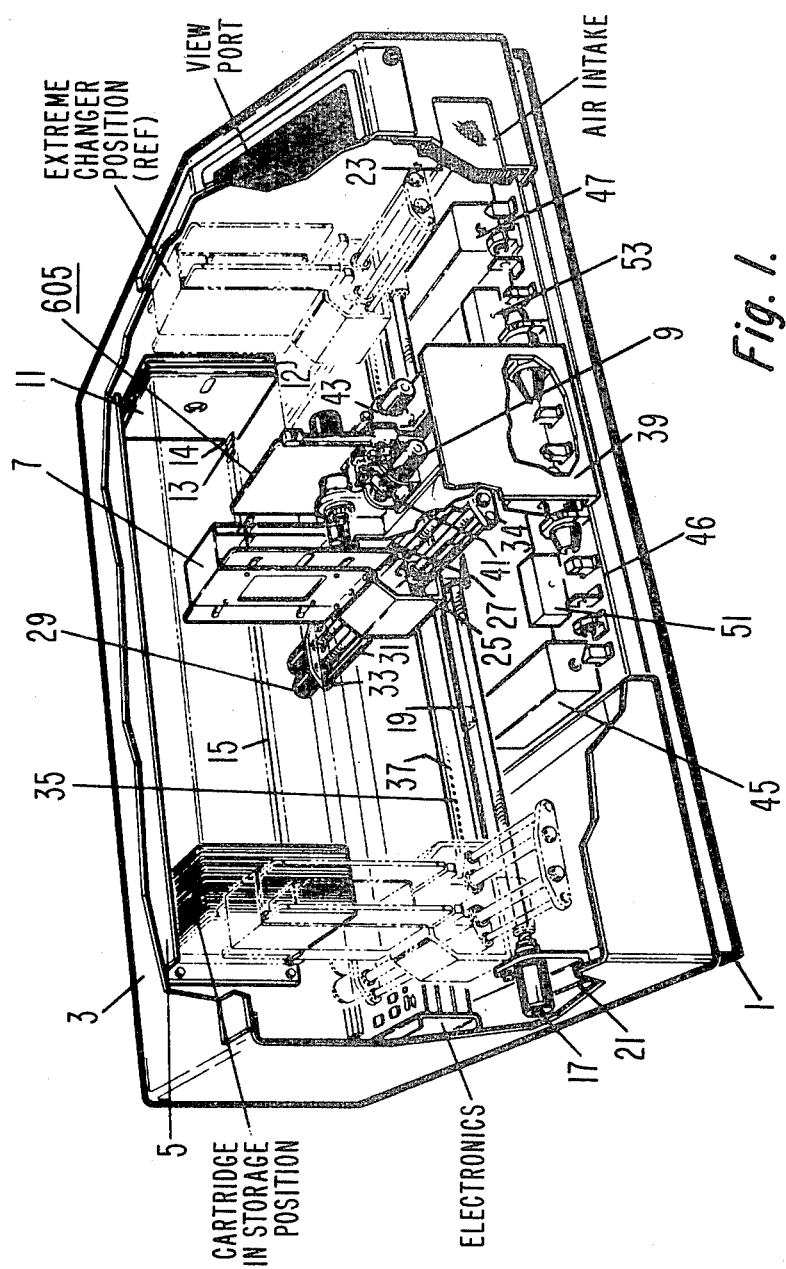
FIG. 1 is a cut-away perspective view of an optical disc player apparatus in accordance with the present invention.

Referring to FIG. 1, a cut-away perspective view of an optical disc player apparatus is illustrated. The player is mounted on a base 1 and enclosed by a sheet metal case 3. The player comprises a storage module 5, a cartridge changer 7 and a reader module 9.

Figure 2:
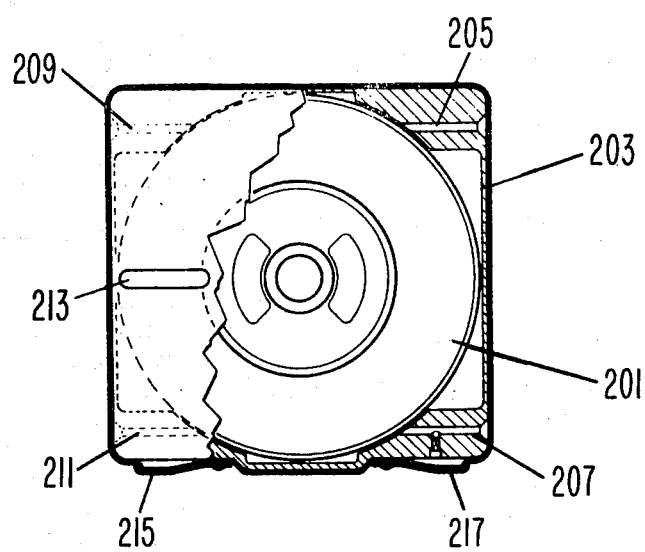
FIG. 2 is a plan view of a protective cartridge partially cut-away to show the disc enclosed therein.

As shown in FIG. 2, an optical disc 201, which may, for example, be of a type described in U.S. Pat. No. 4,097,895 to F. W. Spong issued on June 27, 1978, having data stored on the surface thereof in the form of undulations or pits is enclosed in a protective cartridge 203. The cartridge 203 is provided with alignment and retaining means 205, 207, 209, 211, which may, for example, be pin holes, for storing cartridge 203 in the storage module 5 and orienting it in the reader module 9. Reading the data from disc 201 is accomplished through a read head slot 213 which, as will be explained in more detail infra, permits a coherent light beam in reader module 9 to impinge on a surface of the disc 201. Magnetically actuated springs 215, 217 are attached by appropriate means, for example, screws, to the base of cartridge 203. Cartridge 203 is transported between the storage module 5 and the reader module 9 by electromagnetically coupling the springs 215, 217 to the cartridge changer 7 (the operation of this coupling will be explained in detail with reference to FIG. 4).

Referring again to FIG. 1, cartridges 11, 12, which are similar to that described with reference to FIG. 2, are arranged in storage module 5 along with a plurality of cartridges of similar design. In the embodiment shown in FIG. 1 up to 100 cartridges may be stored by hanging the cartridges at the top and bottom by pins such as 13, 14 (top pins are not shown in the figure). Pins 13, 14 are fastened to frame member 15 such that cartridges 11, 12 can be attached to and detached from pins 13, 14 with ease. For example, pins 13, 14 which have tapered points are mounted to frame member 15 so that they "float".

Cartridge changer 7 is mounted on a ball screw and drive 17 and guide bar 19. Guide bar 19 and ball screw and drive 17 are attached to frame members 21, 23. Carrier 25 is mounted to ball screw and drive 29 and guide bar 31. Guide bar 31 and ball screw and drive 29 are attached to cartridge changer 7 by brackets 33, 34. Similarly, carrier 27 is mounted to cartridge changer 7. A position sensor strip 35 for positioning cartridge changer 7 with respect to a cartridge in storage module 7 or reader module 9 is assembled to frame members 21, 23. Each cartridge postiion is identified by a light source 37. A photodetector 301 (FIG. 3) attached to cartridge changer 7 searches for an energized light source to properly position cartridge changer 7 for the next cartridge pick-up or delivery.

The reader module 9 is mounted onto bracker 39. Reader module 9 comprises two similar read heads 41, 43. Lasers 45, 47 which are mounted to optics platform 46 provide beams of coherent light to read heads 41, 43. Suitable optics for bending the light beams and forming them to a focused spot on the disc surfaces and playback detectors 51, 53 for detecting the reflected-modulated light beams are also mounted onto optics platform 46. The optics and detectors may, for example, be of the type described in the aforementioned Spong patent. Two mechanical systems, which will be explained in detail herein, are associated with the reader module. The first is a system for receiving, securing and spinning the disc and the second is used for translating the read heads 41, 43.

Figure 3:
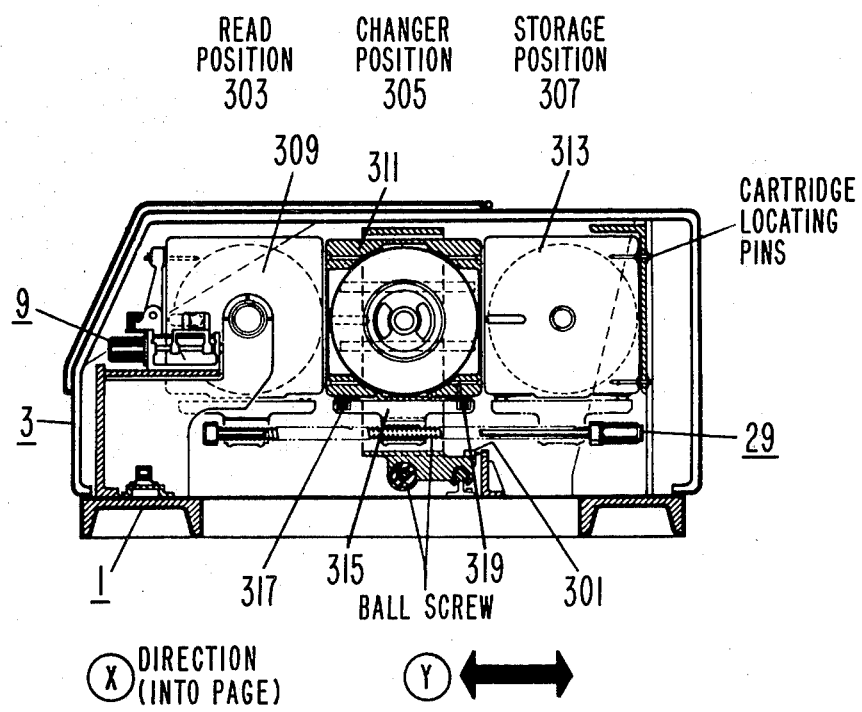
FIG. 3 is a cross-sectional side view of the optical disc player apparatus of FIG. 1.

A cross-sectional side view of the optical disc player of FIG. 1 is shown in FIG. 3. In this figure cartridges 309, 311 and 313 are shown mounted in read position 303, changer buffer position 305 and storage position 307 respectively. While being transported, cartridge 311 is attached to carrier 315 by electromagnets 317, 319.

Figure 4:
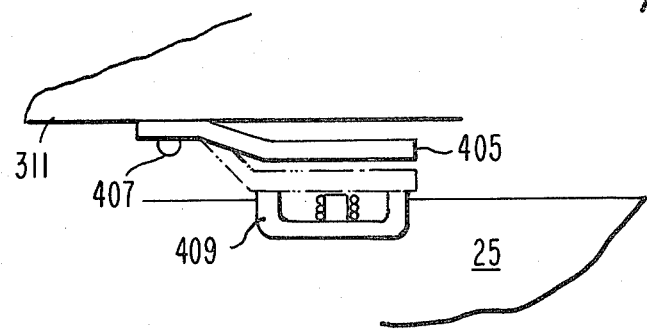
FIG. 4 illustrates the latching mechanism used to secure a protective cartridge to the cartridge carrier.

Referring to FIG. 4, the coupling of cartridge 311 to carrier 25 is illustrated. Cartridge 311 has a magnetically actuated spring 405 attached thereto by suitable means, for example, screw 407. Electromagnet 409 is embedded in carrier 25. In the latched position (shown in phantom in FIG. 4), electromagnet 409 is energized by a source of electric energy (not shown) such that spring 405 is deflected into engagement with electromagnet 409. With electromagnet 409 and a similar electromagnet at the other end of cartridge 311 energized, cartridge 311 can be transported between the read position 303 and the storage position 307 of FIG. 3.

Figure 5:
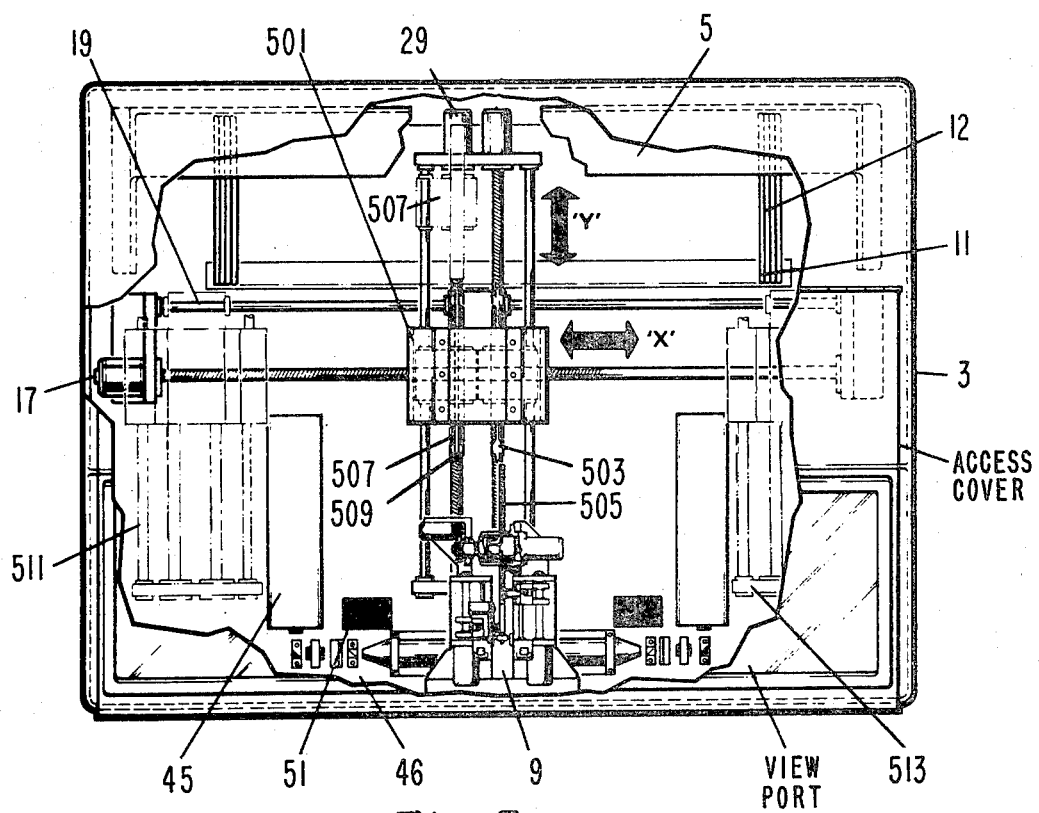
FIG. 5 is a plan view partially cut-away of the optical disc player apparatus of FIG. 1.

FIG. 5 is a plan view, partially cut-away, which illustrates certain aspects of the optical disc player apparatus of FIG. 1. Two orthogonal directions "X", "Y" are shown in the FIGURE. Changer carriage assembly 501 is shown in a buffer position aligned such that the right carrier 503 can be activated to retrieve cartridge 505 by moving the "Y" direction. Carrier 507 is positioned in a buffer position with cartridge 509, the next cartridge to be read, attached thereto. One of the extreme "Y" positions (i.e., storage position) of carrier 507 is represented in phantom by reference numeral 507. Similarly, the extreme "X" positions of changer carriage assembly 501 are represented by reference numerals 511 and 513.

Figure 6:
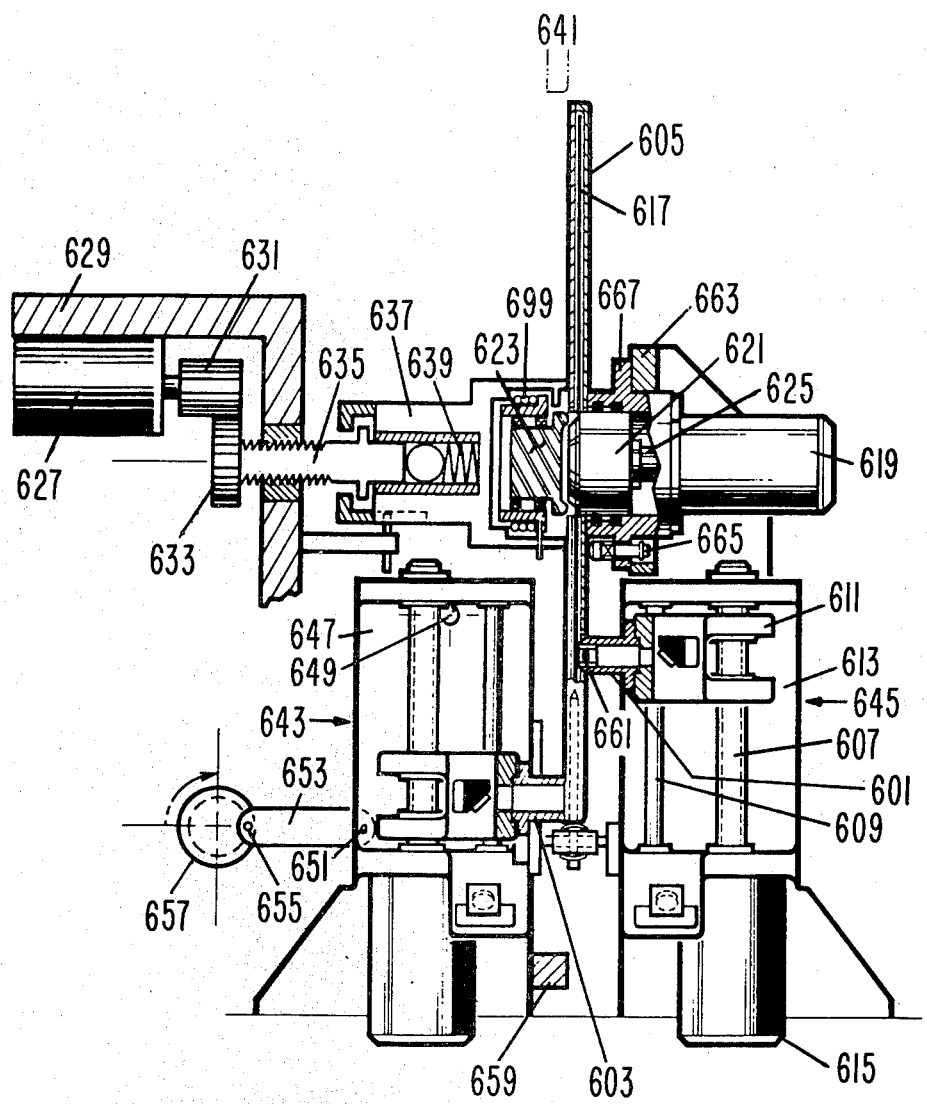
FIG. 6 is a plan view of the read station of the optical disc player apparatus of FIG. 1.

FIG. 6 is a plan view of the read station of the optical disc player apparatus of FIG. 1 showing read heads 601, 603. With cartridge 605 in the read position as shown, read heads 601, 603 are inserted into the access slots (not shown) of cartridge 605. Motor 615 is mounted on bracket 613. Drive screw 607, which is attached to motor 615, and guide bar 609 support and drive transport 611 having read head 601 mounted thereto. As motor 615 rotates, read head 601 is driven radially across the disc 617 enclosed in cartridge 605.

Motor 619 is attached to frame member 663. Shaft 621, which is connected to motor shaft 625, and hub 623 engage disc 617 during the read operation. Disc 617, which is free to rotate inside of cartridge 605, is turned in response to the rotation of motor 619.

Motor 627 which is attached to frame member 629 is used to drive hub 623 into engagement with disc 617. Gear 631 attached to motor 627 engages gear 633. Threaded shaft 635 is attached to rotate with gear 633. Hub 637 which engages both shaft 635 and hub 623 is free to translate but not rotate. It houses spring 639. Spring 699 enclosed in hub 637 biases hub 623 to the right. When motor 627 rotates shaft 635 such that shaft 635 moves to the right, spring 699 urges hub 623 into engagement with disc 617. As shaft 635 moves to the right further, hub 637 moves to engage cartridge 605. Spring 699 yields following engagement of disc 617 with shaft 621 and hub 623. When motor 627 rotates shaft 635 such that shaft 635 moves to the left, hub 637 urges hub 623 out of engagement with disc 617. Extraction device 665 attached to motor mount 667 urges cartridge 605 into a ready position to the left out of engagement with shaft 621. With hub 623 in the open position and cartridge 605 out of the read station, a new disc can be transported into the read station. After the new disc is properly positioned, motor 627 is rotated to urge hub 623 into engagement with the new disc.

During loading and unloading operations disc 617 and cartridge 605 are in cartridge insertion position (ready position) 641. During these operations read head 603 must be moved so that cartridge 605 will clear read head 603. Assembly 643 which is similar to assembly 645 is retractable to permit cartridge 605 to be loaded or unloaded.

The retractable feature is accomplished by the addition of the following elements. Bracket 647 is attached by pin 649 to a frame member (not shown). A read head retractor motor shaft 657 is attached to follower link 653 by pin 655. Follower link 653 is in turn attached to bracket 647 by pin 651. Retractor motor (not shown) is rotated 180° to move read head 603 out of engagement with disc 617. Likewise to effect engagement of read head with disc 617 retractor motor is rotated back to its original position such that bracket 647 is urged against stop 659 which is attached to a frame member.

Read head 601 is provided with a voice coil actuated objective lens 661. The voice coil actuation maintains by means of a capacitor plate (not shown) the spot of the read light beam in proper focus on the surface of disc 617 during the read cycle. For an example of the operation of voice coil actuated objective lens, reference should be made to U.S. patent application No. 777,477 to W. E. Barnette, et al., filed on Mar. 14, 1977.

The mechanical operation of the optical disc player apparatus will now be explained with reference to FIG. 1. A first disc which has been read is in place on carrier 25 of cartridge changer 7 and a second disc has just been placed in the reader 9. The changer 7 then moves to the location of a third disc which is stored in storage module 5. With the empty carrier 27 of changer 7 aligned with the third disc (i.e., the next disc to be read), the carrier 27 grips the third disc, through the operation of the electromagnetic devices associated with carrier 27, and moves it into the buffer position between storage module 5 and reader module 9. The changer 7 then indexes the distance of one compartment. In this position the first disc is transported into the storage position that the third disc just occupied. With carrier 25 now empty changer 7 traverses to align carrier 25 with the second disc which has been read during the load, unload operation. The second disc is picked up in carrier 25 and moved into the buffer position. Again changer 7 is indexed the distance of one compartment to align the third disc with the read module and carrier 27 transports the third disc into the read module. With carrier 27 now empty the changer 7 moves to access a fourth disc (i.e., the next disc to be read) and the cycle is repeated.

To provide rapid access it is desirable that an empty carrier traverse the "Y" direction while changer 7 is moving in the "X" direction. In a fast access system, it is undesirable to wait for an empty carrier to move to a neutral position by traversing first the "Y" direction before changer 7 begins to traverse the "X" direction.

It is believed that with proper choice of drive assemblies the system can cycle to retrieve a new disc from a storage module 40" long containing 100 discs in approximately 2.6 seconds.

Figure 8:
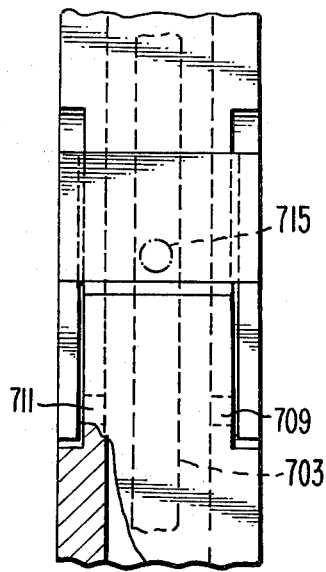
FIG. 8 is a side view of the protective cartridge of FIG. 7.
Figure 7:
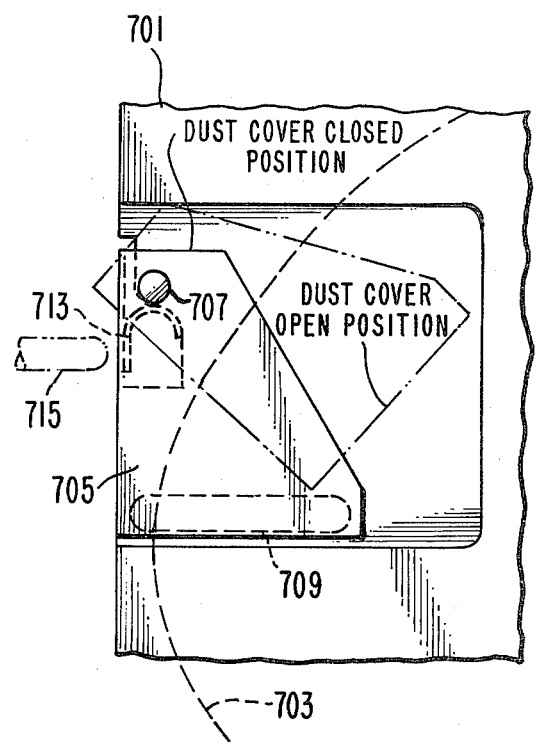
FIG. 7 is a plan view of a portion of the protective cartridge of FIG. 2 showing a dust cover arrangement for the read access slot.

Referring to FIGS. 7 and 8, a dust cover arrangement is illustrated for the cartridge of FIG. 2. In the Figures a cartridge 701 having disc 703 enclosed therein is shown with a dust cover 705. Dust cover 705 is attached and hinged to cartridge 701 by pin 707 such that in the closed position dust cover 705 covers read slots 709, 711. Return spring 713 attached to dust cover 705 biases dust cover 705 in a closed position. During storage and transport of cartridge 701, dust cover 705 is arranged in a closed position to reduce dust or dirt accumulation on the disc surface. As cartridge 701 is moved into the read station of the player an actuating plunger 715, attached to a frame member of the player (not shown) urges 713 and dust cover 705 into an open position as shown in phantom in FIG. 7.

While the principles of the present invention have been demonstrated with particular regard to the illustrative structures of the Figures, it will be recognized that various departures from such illustrative structures may be undertaken in practice of the invention. For example, the optical disc apparatus could effect recording as well as reading. In the record mode the lasers of FIG. 1 could be modulated in accordance with the teachings of the aforementioned Spong patent to evaporate, vaporize or ablate the recording layer of the optical disc.

What is claimed is:

1. In a data storage system for optically reading information stored on an optical disc, said system having a storage module having a plurality of storage locations for storing said optical disc enclosed in a protective cartridge, the system having a reader for optically reading information stored on said optical disc, a disc changer, comprising:

a carriage having at least two positioning and retracting carriers for supporting said disc enclosed in said protective cartridge during transfer between said storage module and said reader;

means, connected to said carriers, for gripping said protective cartridge during transfer between said storage module and said reader;

first means for driving said carriage in a direction to align said disc enclosed in said protective cartridge with one of said plurality of storage locations;

second means for driving one of said at least two positioning and retracting carriers in a direction normal to the direction in which said carriage is driven by said first means; and third means for driving another of said at least two positioning and retracting carriers in a direction parallel to the direction in which said second means is driven;

said first driving means being operated simultaneously with said second driving means when said one of said at least two positioning and retracting carriers is not supporting said disc and with said third driving means when said another of said at least two positioning and retracting carriers is not supporting said disc.

2. A disc changer according to claim 1 wherein said second driving means comprises a first ball screw and drive mechanism for driving said one of said at least two positioning and retracting carriers; and said third driving means comprises a second ball screw and drive mechanism for driving said another of said at least two positioning and retracting carriers.

3. A disc changer according to claim 2 wherein said first means for driving said carriage comprises a ball screw and drive mechanism.

4. A disc according to claim 3 wherein said protective cartridge has a magnetically actuated spring coupled thereto and wherein said gripping means comprises an electromagnetic device for coupling said gripping means to said protective cartridge when said electromagnetic device is activated by a source of electrical energy.

* * * * *